Patented Aug. 1, 1939

2,168,258

UNITED STATES PATENT OFFICE 2,168,258

GEAR LUBRICANT

Gerald M. Fisher, Los Angeles, Calif., assignor to Socony-Vacuum Oil Company, Incorporated, New York, N. Y., a corporation of New York No Drawing. Application September 4, 1937, Serial No. 162,548

7 Claims. (Cl. 196—151)

In the manufacture of lubricants for heavy duty gearing, difficulty is often experienced in obtaining sufficient adhesion of the lubricant to the metal of the gears. This is manifested in a tendency for the grease or highly viscous oil to slide off the contacting faces, leaving only a very thin film which is insufficient to maintain itself against the high pressures encountered. Where the lubricant does not adhere to the metal surface with sufficient tenacity, there is danger of the thin film's being penetrated by the engaging metal surfaces, which are thus allowed to come into metal to metal contact and are rapidly damaged or destroyed.

These lubricants may be compounded greases, or they may be heavy and highly viscous residuals from petroleum oils more or less free from asphalt, or for rough open gears they may even consist of crude petroleum residua containing or blended with petroleum asphalt.

I have discovered that lubricants of this general type, in which color is immaterial and which are to be subjected to high pressures, may have their adhesiveness for metals greatly increased by dissolving in and blending with them the resin remaining from the steam distillation of certain classes or groups of naphthenic acids.

The naphthenic acids, as is very well known, occur in the distillates from many petroleums, from which they are separated by conversion into water-soluble alkali-metal salts followed by precipitation of the free acids by addition of dilute mineral acid to the aqueous solution. The blackish oil thus obtained is customarily purified by treatment with sulfuric acid and adsorbent clays or by a polymerization reaction using formaldehyde, for example, as a condensing agent.

After either of these treatments, or any other purifying treatment which may be preferred, I submit the treated acids to steam distillation, which results in the production of a brownish or blackish undistilled residue. This residue I further concentrate by distillation in a current of steam, if necessary, finally bringing the still bottom to the condition of a thickly viscous, semi-solid or solid resin. This resin is fusible without decomposition, is soluble in petroleum when heated, and has an odor resembling coal tar pitch rather than that of asphalt. The yield will vary widely, not only with the character of the crude acids but also with the manner in which they are purified and the depth to which the final distillation is carried, but the characteristic properties of the resin are quite constant through such variations.

As is well known, the molecular weight of the mixtures of acids obtained from petroleum fractions of increasing specific gravity likewise increases, while the acid number correspondingly decreases. For example, average figures for approximate molecular weight (first column) and for approximate acid number (second column) for the naphthenic acids from fractions separated from California crudes are as follows:

|  | Mol. wt. | Acid No. |
|---|---|---|
| Gasoline fraction | 185 | 300 |
| Kerosene fraction | 215 | 250 |
| Gas oil fraction | 335 | 175 |

I find that the suitability of the resins from these petroleum fractions for the purposes above described increases with increasing molecular weight, and that the resins prepared from the gasoline acids are only slightly if at all useful for this purpose because of their lack of solubility in the lubricants to be treated. The mixed acids having average molecular weight of 200 or over are useful for this purpose while the higher boiling acid mixtures, having an average molecular weight of 300 or over, are still more desirable.

The kerosene and gas oil acid residues above described may be added to heavy duty lubricants in any desired proportion, as for example from 5% to 20% by volume, and will be found to yield a lubricant of highly superior tackiness and adhesiveness, and one in which these qualities persist over long periods of use. In these respects the above described resins will be found far superior to the asphalts which heretofore have been used for the same purpose.

I claim as my invention:

1. A resinous substance soluble in petroleum, having a thickly viscous to solid consistency, a blackish color and the property of increasing the adhesiveness of petroleum gear lubricants when mixed therewith, said substance being the residue from the distillation of naphthenic acids obtained from petroleum fractions heavier than gasoline.

2. A resinous substance soluble in petroleum, having a thickly viscous to solid consistency, a blackish color and the property of increasing the adhesiveness of gear lubricants when mixed therewith, said substance being the residue from the distillation of naphthenic acids obtained from petroleum and having an average molecular weight not less than 200.

3. A resinous substance soluble in petroleum, having a thickly viscous to solid consistency, a blackish color and the property of increasing the adhesiveness of petroleum gear lubricants when mixed therewith, said substance being the the residue from the distillation of naphthenic acids obtained from petroleum and having an average molecular weight not less than 300.

4. A gear lubricant comprising a heavy petroleum residuum together with the resin remaining from the distillation of petroleum naphthenic acids having higher molecular weight than the acids contained in gasoline, said resin having a thickly viscous to solid consistency, a blackish color, and the property of increasing the adhesiveness of petroleum lubricants when mixed therewith.

5. A gear lubricant comprising a heavy petroleum residuum together with the resin remaining from the distillation of petroleum naphthenic acids having an average molecular weight not less than 200, said resin having a thickly viscous to solid consistency, a blackish color, and the property of increasing the adhesiveness of petroleum lubricants when mixed therewith.

6. A gear lubricant comprising a heavy petroleum residuum together with the resin remaining from the distillation of petroleum naphthenic acids having an average molecular weight not less than 300, said resin having a thickly viscous to solid consistency, a blackish color, and the property of increasing the adhesiveness of petroleum lubricants when mixed therewith.

7. A gear lubricant comprising a heavy petroleum residuum, petroleum asphalt, and the residue remaining from the distillation of petroleum naphthenic acids having an average molecular weight not less than 200, said residue having a thickly viscous to solid consistency, a blackish color and the property of increasing the adhesiveness of petroleum lubricants when mixed therewith.

GERALD M. FISHER.